(12) United States Patent
Gillespie et al.

(10) Patent No.: US 9,630,485 B2
(45) Date of Patent: Apr. 25, 2017

(54) REVERSIBLE ENGINE MOUNT

(71) Applicant: Hasport Performance, Inc., Phoenix, AZ (US)

(72) Inventors: Brian Gillespie, Phoenix, AZ (US); Keith Gillespie, Tempe, AZ (US)

(73) Assignee: Hasport Performance, Inc., Phoenix, AZ (US)

(*) Notice: Subject to any disclaimer, the term of this patent is extended or adjusted under 35 U.S.C. 154(b) by 0 days.

(21) Appl. No.: 15/002,269

(22) Filed: Jan. 20, 2016

(65) Prior Publication Data

US 2016/0229279 A1   Aug. 11, 2016

Related U.S. Application Data

(60) Provisional application No. 62/112,169, filed on Feb. 5, 2015.

(51) Int. Cl.
*B60K 5/12* (2006.01)

(52) U.S. Cl.
CPC ......... *B60K 5/1283* (2013.01); *B60Y 2304/05* (2013.01)

(58) Field of Classification Search
CPC .... B60K 5/1283; B60K 5/1216; B62D 21/11; B60Y 2304/05
See application file for complete search history.

(56) References Cited

U.S. PATENT DOCUMENTS

| | | | |
|---|---|---|---|
| 2,953,336 A | 9/1960 | Etchells | |
| 3,219,138 A | 11/1965 | Kishline | |
| 3,841,426 A | 10/1974 | Nemschoff | |
| 4,467,992 A | 8/1984 | Morimura et al. | |
| 4,572,321 A * | 2/1986 | Morita | B60K 5/04 180/297 |
| 5,305,847 A * | 4/1994 | Mefford | B60K 5/1216 180/291 |
| 9,212,716 B2 * | 12/2015 | Yoon | F16F 6/005 |
| 2004/0154855 A1 * | 8/2004 | Hirayu | B60K 5/1216 180/312 |
| 2015/0129331 A1 * | 5/2015 | Konishi | B60K 5/12 180/54.1 |

OTHER PUBLICATIONS

Hasport Performance, Inc.; DCLH Engine Mount, Sep. 2002, 1 Page, U.S.
Hasport Performance, Inc.; EGJ1 Engine Mount, Dec. 2008, 1 Page, U.S.

* cited by examiner

*Primary Examiner* — Drew J Brown

(57) ABSTRACT

An engine mount for a motor vehicle that is capable of being mounted in two orientations such that it allows two different series of engine designs to be installed in the vehicle while maintaining prescribed mounting elevations for either series of engine design. The engine mount is accompanied by a second engine mount of identical design serving the same purpose of determining the engine's mount height, but also providing a second attachment to support the engine and bear engine loads. Both of these engine mounts are attached to the vehicle's body or frame and also incorporate other known hardware such as brackets, bushings, and other common mechanical fasteners.

6 Claims, 3 Drawing Sheets

REVERSIBLE ENGINE MOUNT

CROSS-REFERENCE TO RELATED APPLICATIONS

This application claims the benefit of provisional patent application Ser. No. 62/112,169, filed Feb. 5, 2015 by the present inventors.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of vehicles. More particularly, the present invention is in the technical field of mounting an engine or propulsion unit.

The following is a tabulation of some prior art that presently appears relevant:

| U.S. Patents | | | |
| --- | --- | --- | --- |
| Pat. No. | Kind Code | Issue Date | Patentee |
| U.S. Pat. No. 2,953,336 | 248/605, 248/613 | Sep. 20, 1960 | Eugene B. Etchells |
| U.S. Pat. No. 3,219,138 | 180/57, 180/380, 180/292 | Nov. 23, 1965 | Floyd R. Kishline |
| U.S. Pat. No. 3,841,426 | 180/53.1, 180/291, 248/659 | Oct. 15, 1974 | Mark S. Nemschoff |
| U.S. Pat. No. 4,467,992 | 248/659, 180/300 | Aug. 28, 1984 | Hiroaki Morimura et al. |

There are many reasons a customer may want to replace the engine in his vehicle with a different engine. This, however, presents a problem as different makes and model of engine are mounted in various positions within the vehicle's engine compartment and with different types of fastening hardware. Additionally, the location and design of the replacement engine may cause further problems in terms of fully integrating the engine with other vehicle systems. While each engine "swap" is unique and presents its own integration problems, common areas of concern are the mechanical linkage from the engine's driveshaft to the drive-wheels of the vehicle, connection to the exhaust and air intake systems, and integration of hydraulic and electrical systems.

As each swap scenario is unique, these problems had previously been solved with unique solutions. Many hours of measurement, design, fabrication, and other work may be spent on a single swap. Often, the product of all this labor is only useful in the one scenario for which the swap was performed. This means any particular engine swap project may even be customized to the point of being a lone example in the field. Given the amount of skill, time, and creativity necessary to produce these customized solutions, it is not surprising that an engine swap is usually an expensive proposition.

Still, the popularity of engine swaps has led some manufacturers to produce kits that contain the necessary hardware to complete an engine swap. A typical kit contains many types of hardware including metal brackets, bushings, wiring harnesses, nuts, bolts, washers, as well as a "mount" that acts as the mechanical fastening point between the engine and the body or frame of the vehicle. The design of these kits is dictated by the choice of engine to be swapped and the choice vehicle to receive that engine.

Again, given the unique nature of each engine swap, a kit is usually only useful for a particular engine to be swapped into a particular model of vehicle (though often spanning some model years).

Known motor mount designs in patent publications are similar to these manufactured kits in that they do not recognize the need to accommodate more than one series of engine design. In fact, U.S. Pat. No. 2,953,336 to E. B. Etchells refers to a singular series stating, "Although engine and transmission assemblies of different designs will have different characteristics, a series of identical assemblies will have substantially identical characteristics, so that identical mountings may be used for all assemblies in the series." Etchells recognizes a benefit of using identical mountings, but does not recognize the need to accommodate more than one series of engine design. Similarly, the designs in U.S. Pat. No. 3,219,138 to Floyd R. Kishline, U.S. Pat. No. 4,467,992 to Hiroaki Morimura et al., and U.S. Pat. No. 3,841,426 to Mark S. Nemschoff primarily address common problems such as carrying engine loads and isolating vibrations, but none address the need to accommodate more than one series of engine design.

BRIEF SUMMARY OF THE INVENTION

The present invention is an engine mount that accommodates one series of engines its first orientation and accommodates a second, different series of engines in a second orientation. This is accomplished by a flange on the engine mount which is located offset from the center of the body of the engine mount. When the mount is in one orientation, the center of the flange is lower than the center of the body of the mount. When the mount is flipped, the center of the flange is above the center of the body. The difference in the heights of the flange allows one series of engine design to be mounted higher than the other relative to the vehicle's body or frame. This difference in height is prescribed by integration points between the engine of the vehicle and other vehicle systems.

Figure 1:
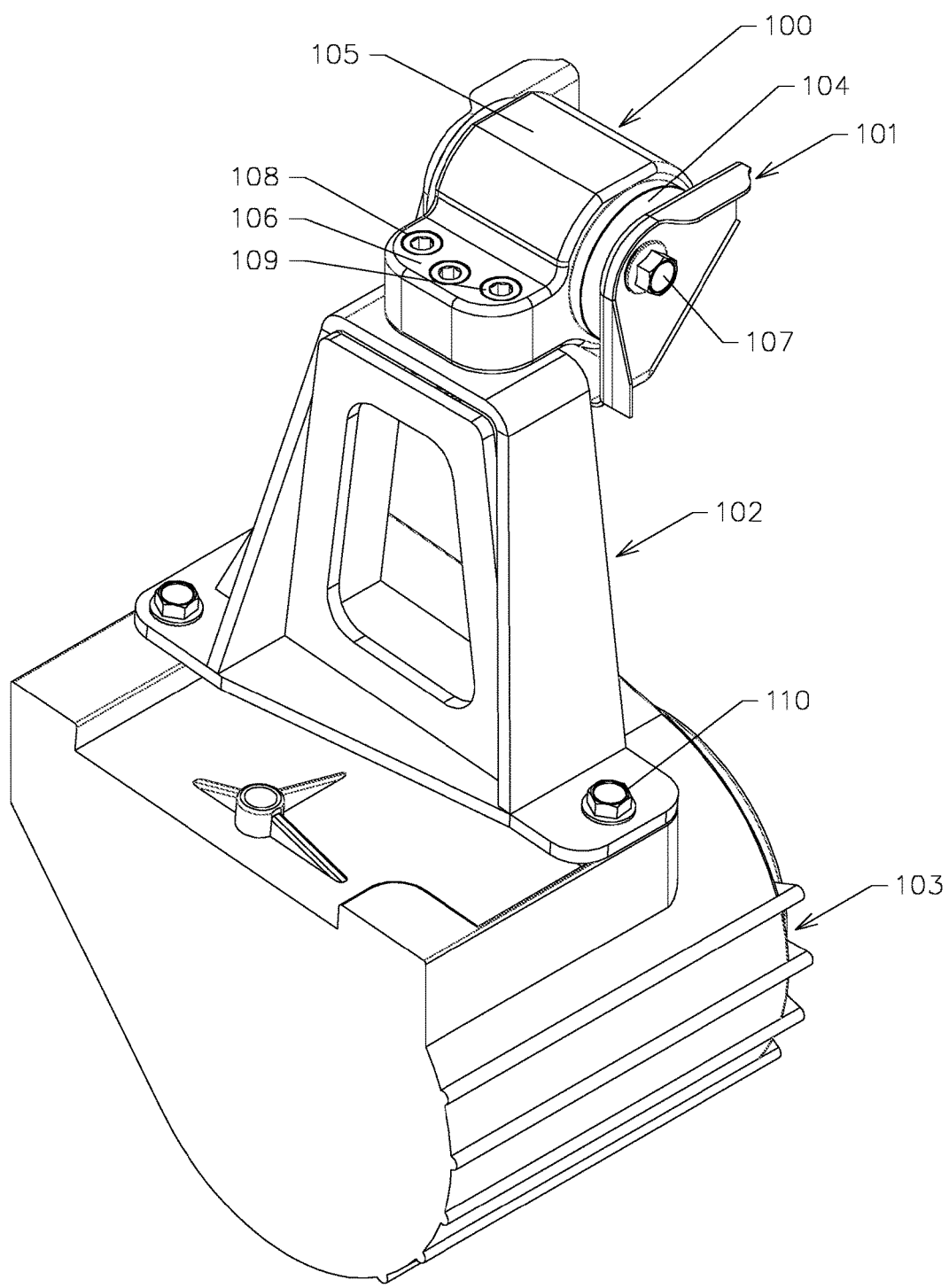
FIG. 1 is a perspective view of an engine mount of the present invention, an engine, a bracket, bushings, and associated fastening hardware.

| REFERENCE NUMERALS IN THE DRAWINGS | |
|---|---|
| 100 - engine mount | 101 - vehicle body |
| 102 - bracket | 103 - engine |
| 104 - bushing | 105 - body |
| 106 - flange | 107 - bolt |
| 108 - hole | 109 - bolts |
| 110 - bolts | 300 - pin |
| 301 - cavity | |

DETAILED DESCRIPTION OF THE INVENTION

Referring now to the invention in more detail, in FIG. 1 there is shown a novel engine mount 100 attached to a vehicle's body 101 and also attached to a bracket 102. The bracket 102 extends downward from the engine mount 100 and is also attached to an engine 103. A bushing 104 is shown in either end of a substantially cylindrical body 105 of the engine mount 100. The bracket 102 is attached to a flange 106 on the engine mount 100.

In more detail, still referring to the invention of FIG. 1, the body 105 of the engine mount 100 is attached to the vehicle's body 101 with a bolt 107. This bolt 107 runs roughly parallel to the longitudinal axis of the vehicle and through the center of the body 105 of the engine mount 100, securing the engine mount 100 to the vehicle body 101. The flange 106 of the engine mount 100 extends outward from the body 105. Bolts 109 with nuts (obscured from view) secure the top horizontal surface of the bracket 102 to the bottom horizontal surface of the flange 106 through holes 108. In turn, bolts 110 secure the bracket 102 to the engine 103 by threading into the engine 103 itself.

In further detail, still referring to the invention of FIG. 1, the horizontal surfaces of the flange 106 are located relative to the centerline of the body 105 such that in one orientation of the engine mount 100, the surface of the flange 106 that is in contact with the bracket 102 is at some prescribed height relative to the vehicle body 101 and in a second orientation of the engine mount 100 the surface of the flange 106 that is in contact with the bracket 102 is at a different prescribed height relative to the vehicle body 101 which is above that of the first orientation. The second orientation being achieved by installing the engine mount 100 in roughly the same location as that in the first orientation, but "flipped" (or rotated) approximately 180° about a horizontal axis running perpendicular to the longitudinal axis of the vehicle. Thus, when the engine mount 100 is in its first orientation, its flange 106 is in a "low" position and when the engine mount 100 is in its second orientation, its flange 106 is in a "high" position. The distinction between these orientations is shown clearly in FIG. 2. This figure shows a front view of the engine mount 100 in its first orientation in continuous lines as well as the engine mount 100 in its second orientation, shown in dashed lines. It also clearly shows the different locations of the flange 106 depending on the orientation of the engine mount 100, while the centerline of the body 105 remains in the same location regardless of the orientation of the engine mount 100.

Figure 4A:
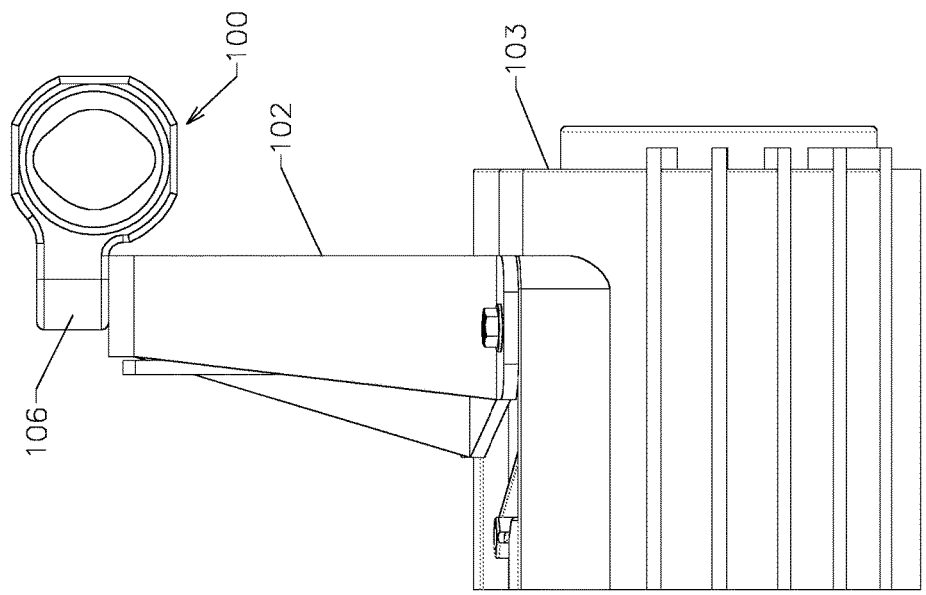
FIG. 4A is a front view of an engine mount of the present invention in its first orientation, a bracket, and an engine.
Figure 4B:
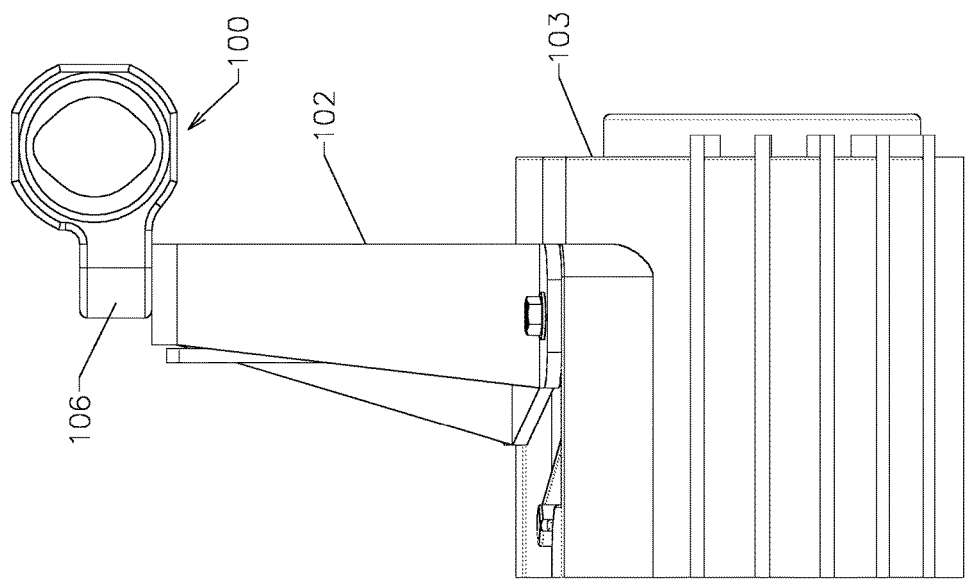
FIG. 4B is a front view of an engine mount of the present invention in its second orientation, a bracket, and an engine.

When the engine mount 100 is in its first orientation, the low position of the flange 106 of engine mount 100 accommodates one type of engine design with longer combustion cylinders. Referring to FIG. 4A, a front view of this configuration is shown with the engine mount 100 in its first orientation (with the flange 106 in low position), the bracket 102, and engine 103. In this figure, the engine 103 is mounted low to accommodate the prescribed height of its longer cylinders. When the engine mount 100 is flipped as previously described, the high position of its flange 106 accommodates another type of engine design with shorter combustion cylinders. Referring to FIG. 4B, a front view of this configuration is shown with the engine mount 100 in its second orientation (with the flange 106 in high position), the bracket 102, and engine 103. In this figure, the engine 103 is mounted higher to accommodate the prescribed height of its shorter cylinders. In other words, the engine mount 100 may be flipped into either orientation to accommodate engine integration with the vehicle exhaust system for either series of engine design. While this embodiment accommodates two different series of engines according to engine cylinder height, other embodiments may employ the same flipping design to accommodate engine integration with other motor vehicle systems such as the mechanical linkage from the driveshaft of the engine 103 to the drive-wheels of the vehicle, connection to the exhaust and air intake systems, hydraulic and electrical systems, ventilation/air conditioning, engine cooling, or other known systems or points of engine integration with the vehicle.

The construction details of the invention as shown in FIG. 1 are that the engine mount 100 may be made of metal or of any other sufficiently rigid and strong material as to withstand any loads caused either directly or indirectly by the engine 103. The engine mount 100 may be manufactured by removing material from a single body of material, casting from molten material, assembling from smaller bodies attached to each other by welding or with mechanical fasteners, etc. or any combination thereof so long as those features that define the spatial relationships between the engine mount 100, the vehicle body 101, and the engine 103 remain. These features include, but are not limited to the shape and thickness of the flange 106, the location of the flange 106 relative to the centerline of the body 105 of the engine mount 100, and the location of the holes 108 relative to the centerline of the body 105. While the body 105 of the engine mount 100 in this embodiment is substantially cylindrical, the body 105 may take any shape so long as the aforementioned features remain. The bracket 102 is known in the art and may be replaced by any other bracket or multiple brackets or similar hardware known in the art that physically secures the engine mount 100 to the engine 103 in its prescribed location. The engine mount 100 may attach to the vehicle body 101 and the bracket 102 by using any type of known mechanical fastener such as nuts, bolts, screws, rivets, etc. or by otherwise joining such as with welding or adhesives. Similarly, the bracket 102 may be attached to the engine 103 with mechanical fasteners, etc. or by otherwise joining such as with welding or adhesives or by any combination thereof. The engine mount 100 is typically accompanied by an identical engine mount supporting the engine 103 at another location on the vehicle body 101 or the vehicle's frame, preferably on the opposite side of the vehicle's engine compartment from the described engine mount 100. This second engine mount is of identical design to that of the described engine mount 100 and may attach to the vehicle body or frame and a bracket (or similar) by any of the same methods as the described engine mount 100. This second engine mount may be mounted at any height as long as it is also attached to a bracket (or similar) of sufficient height to maintain the prescribed height of the engine 103. These two engine mounts may also be accompanied by one or more additional mounts or other fastening hardware that connects the engine 103 to the vehicle body 101. The height at which the engine 103 is mounted, however, is prescribed by the engine mount 100 and its identical counterpart.

Figure 2:
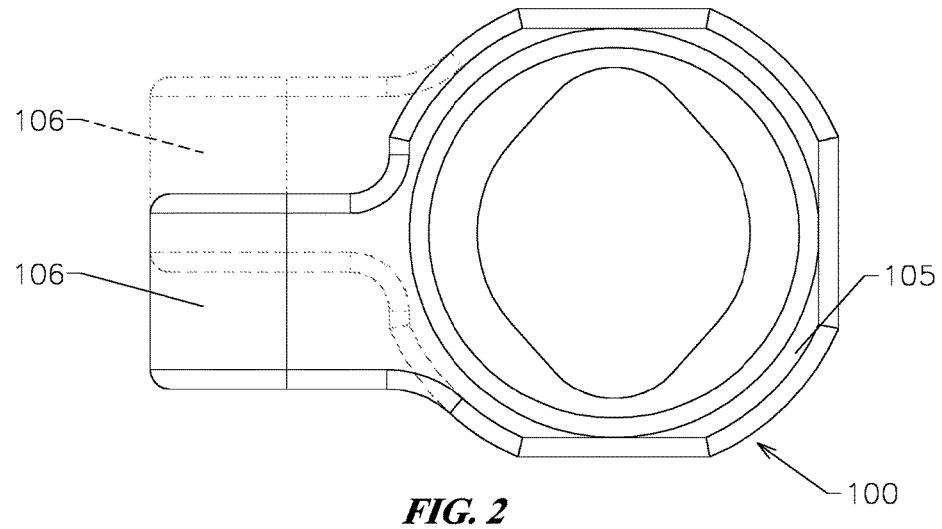
FIG. 2 is an exploded perspective view of an engine mount of the present invention, two bushings, and a pin.
Figure 3:
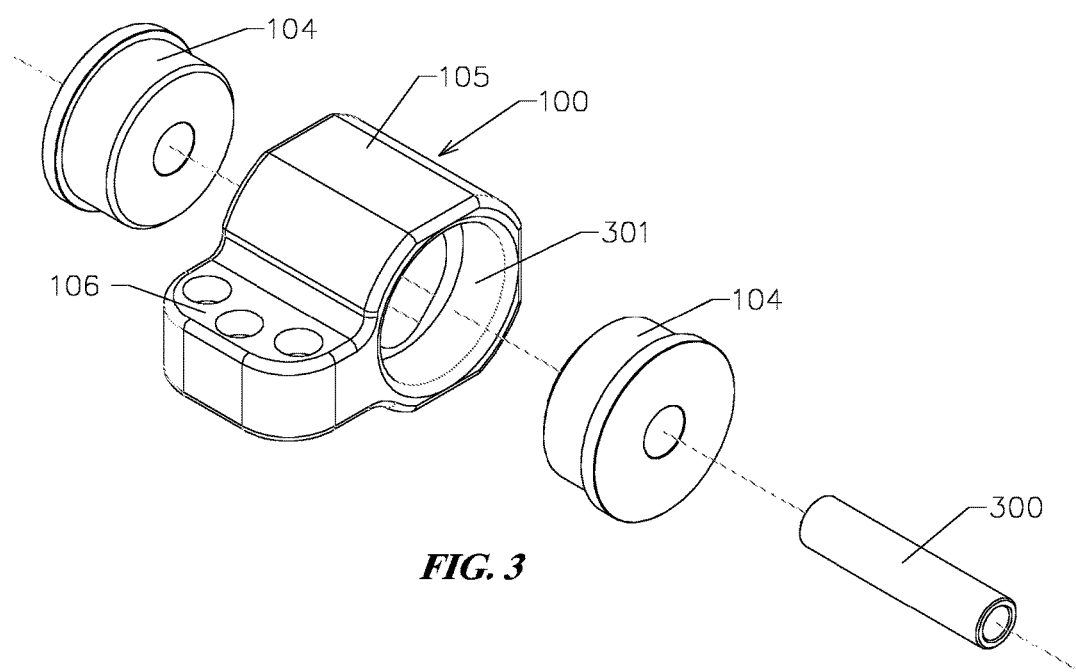
FIG. 3 is a front view of an engine mount of the present invention in its two orientations.

Referring now to FIG. 3, there is shown the engine mount 100 of FIG. 1 and FIG. 2 with substantially cylindrical body 105, and flange 106. There are also two bushings 104 shown as well as a pin 300. These components are shown in an exploded view.

In more detail, still referring to FIG. 3, a cavity 301 is shown into which the bushings 104 are pressed. The pin 300 is simply a hollow cylinder or tube that is pressed through the center holes of both bushings 104. Referring back to FIG. 1, the bolt 107 that attaches the engine mount 100 to the vehicle body 101 runs through the center of this pin 300, which is obscured by other elements in FIG. 1. In operation, the cylindrical bodies of the bolt 107, the pin 300, the bushings 104, and the body 105 of the engine mount 100 are all roughly concentric with one another. The center of these concentric bodies is an axis that runs roughly parallel to the longitudinal axis of the vehicle.

The construction details of the invention as shown in FIG. 3 are that the bushings 104 are of known design and that they may be made of rubber, metal or any material that is strong and stiff enough to withstand compressive loads due to engine weight and resistance to engine torque while in operation. Optionally, as a known practice, the bushings 104 may be made of rubber or similar materials of varying hardness in an effort to isolate engine vibration from the vehicle body 101. In another embodiment, the engine mount 100 may attach directly to the vehicle body 101 without incorporating the pin 300 or the bushings 104. The pin 300 may be made of metal, plastics, or of any other material rigid and strong enough to prevent contact between the bushings 104 and (referring back to FIG. 1) the bolt 107 attached to the vehicle's body 101 when subjected to any load caused directly or indirectly by the engine 103.

The advantages of the present invention include, without limitation, the reduction in manufacturing costs by limiting time spent setting up machine tools and by using material more efficiently. In other words, this one product fills multiple roles in a manufacturer's product lineup. Also, this design allows customers can maintain a supply of one mount design to serve multiple roles and that the end-user benefits by having more choices of engine designs to swap into their vehicle. These and other advantages of one or more aspects are apparent from consideration of the previous description and accompanying drawings.

In broad embodiment the present invention is an engine mount that allows two different series of engines to be mounted to a bracket at two different heights, depending on how the mount is oriented. The engine mount comprises a body comprising a cavity and a flange extending outward from the body. The cavity comprises a central longitudinal axis. The flange comprises bottom and top mounting surfaces and a centerline perpendicular to the central longitudinal axis of the cavity. The bottom mounting surface defining a first horizontal plane that is off-set from the central longitudinal axis of the cavity. The flange further comprises first and second mounting holes extending from the bottom mounting surface to the top mounting surface. The first mounting hole is symmetric to the second mounting hole relative to the centerline of the flange so either the bottom surface or the top surface of the flange may be engaged directly with the bracket. The engine mount further comprising first and second bushings engaged with the cavity. The engine mount further comprises a pin engaged with the first and second bushings. The said cavity is of cylindrical shape and the bottom and top mounting surfaces of the flange are planar. The cavity and the flange are of unitary construction.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. An engine mount for use in mounting different engine types to a bracket engaged to a vehicle, the engine mount comprises: a body comprising a cavity and a flange extending outward from said body; said cavity comprises a central longitudinal axis; said flange comprises bottom and top mounting surfaces and a centerline perpendicular to said central longitudinal axis of said cavity; said bottom mounting surface defining a first horizontal plane that is off-set from said central longitudinal axis of said cavity; said flange further comprises first and second mounting holes extending from said bottom mounting surface to said top mounting surface; said first mounting hole is symmetric to said second mounting hole relative to said centerline of said flange so either said bottom surface or said top surface of said flange may be engaged directly with the bracket.

2. The engine mount of claim 1, further comprising first and second bushings engaged with said cavity.

3. The engine mount of claim 2, further comprising a pin engaged with said first and second bushings.

4. The engine mount of claim 1, wherein said cavity is of cylindrical shape.

5. The engine mount of claim 1, wherein said bottom and top mounting surfaces of said flange are planar.

6. The engine mount of claim 1, wherein said cavity and said flange are of unitary construction.

* * * * *